United States Patent [19]

Bou-Mikael

[11] Patent Number: 4,907,651
[45] Date of Patent: Mar. 13, 1990

[54] METAL-TO-METAL PACKER SEAL FOR DOWNHOLE DISCONNECTABLE PIPE JOINT

[75] Inventor: Sami Bou-Mikael, Kenner, La.

[73] Assignee: Texaco Inc., White Plains, N.Y.

[21] Appl. No.: 136,617

[22] Filed: Dec. 21, 1987

[51] Int. Cl.⁴ .............................................. E21B 33/10
[52] U.S. Cl. .................... 166/114; 166/115; 166/116; 166/196; 166/242; 277/172; 277/236; 285/332.3; 285/332.4; 285/351; 285/917
[58] Field of Search .................. 166/114–117, 166/180, 195, 196, 242, 380; 285/917, 334.4, 332.3, 332.2, 351; 277/236, 170–172, 207 A, 168

[56] References Cited

U.S. PATENT DOCUMENTS

| | | | |
|---|---|---|---|
| 1,642,745 | 12/1924 | Pearce | 166/67 |
| 1,905,115 | 4/1933 | Lofgren | 285/332.3 X |
| 1,968,563 | 7/1934 | Lofgren | 285/332.3 X |
| 2,523,995 | 9/1950 | Parmesan | 285/332.3 X |
| 2,568,232 | 9/1951 | Hamer | 285/332.4 X |
| 3,302,736 | 2/1967 | Kisling | 175/297 |
| 3,330,568 | 7/1967 | Wetzel | 277/198 |
| 3,345,084 | 10/1967 | Hanes et al. | 285/334.4 X |
| 3,537,733 | 11/1970 | Martin | 285/332.3 |
| 3,602,303 | 12/1967 | Blenkarn | 166/360 |
| 3,767,216 | 10/1973 | Lucien et al. | 277/213 |
| 3,797,835 | 3/1974 | Wehner | 277/171 |
| 4,288,082 | 9/1981 | Setterberg | 277/125 |
| 4,484,750 | 11/1984 | Scruggs | 285/917 X |
| 4,602,796 | 7/1986 | Setterberg | 277/236 |
| 4,660,869 | 4/1987 | Gabus | 285/351 X |

FOREIGN PATENT DOCUMENTS 204900  10/1923  United Kingdom .............. 285/332.3

Primary Examiner—Hoang C. Dang
Attorney, Agent, or Firm—Robert A. Kulason; James J. O'Loughlin; Robert B. Burns

[57] ABSTRACT

A metal-to-metal packer seal for downhole use in a well that operates in a deleteriously corrosive atmosphere. The seal is formed by the cooperating ends of two pipe sections, one of which is vertically positioned in a well with an upwardly facing metallic socket. The corresponding upper pipe section includes a connector which is lowered onto the socket and carries with it at least one, and preferably a plurality of metal rings which are extruded to form a corrosive resistant circular seal between the engaged pipe socket and pipe connector.

13 Claims, 4 Drawing Sheets

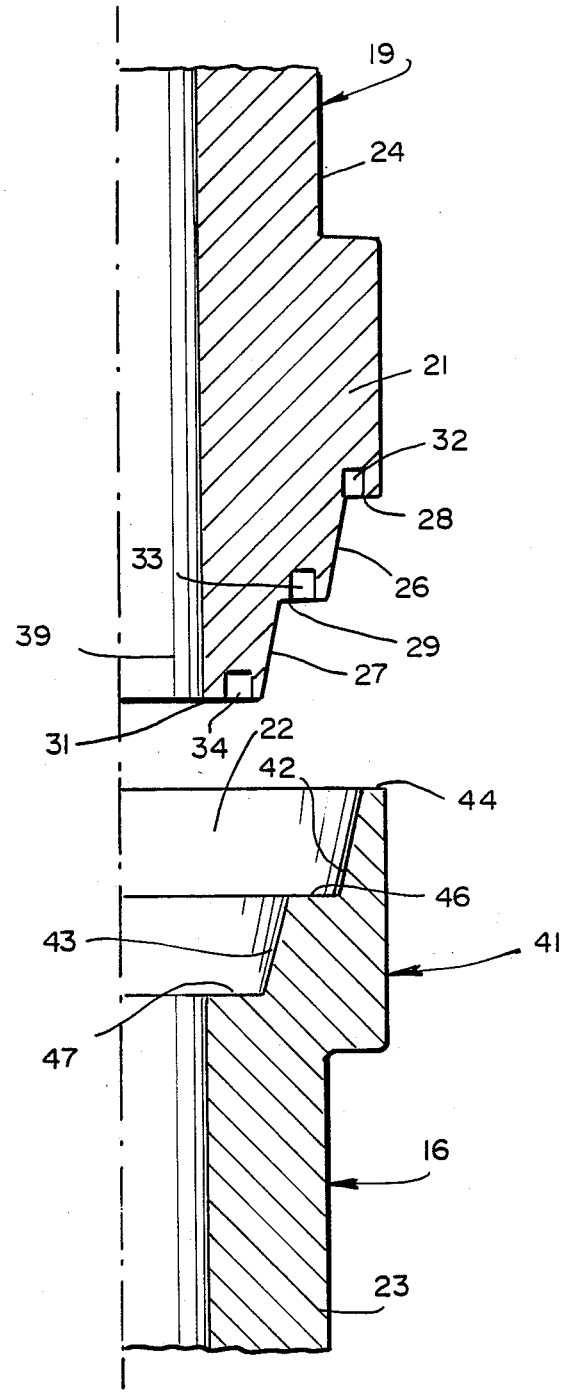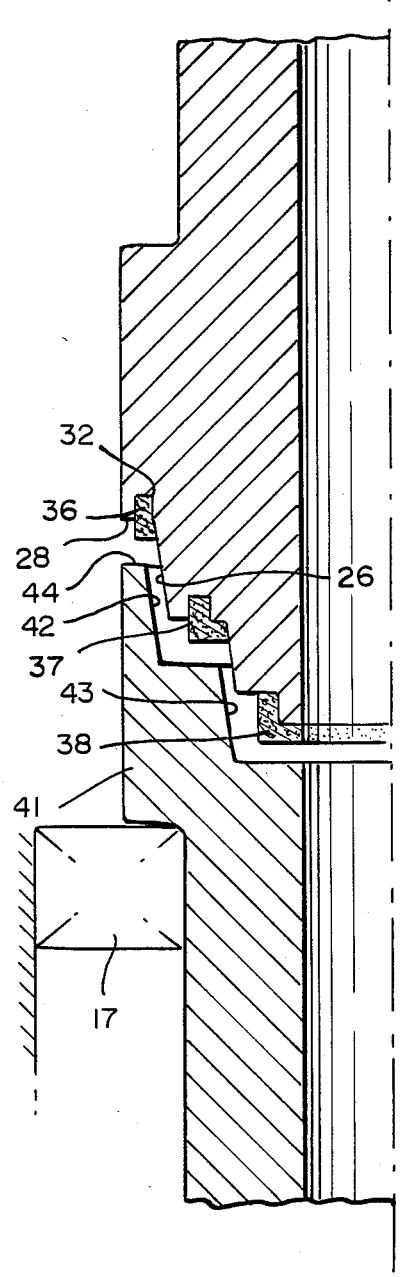

METAL-TO-METAL PACKER SEAL FOR DOWNHOLE DISCONNECTABLE PIPE JOINT

BACKGROUND OF THE INVENTION

In any well for the production of hydrocarbon products from a subterranean reservoir, over a period of time the production rate will tend to decrease. This decrease is attributable to many factors. However, at least some of them can be overcome so that a desired production rate can be restored or maintained.

Often the decrease in production is attributable to conditions within the hydrocarbon holding substrate. This condition can frequently be narrowed to the lack of reservoir pressure sufficient to urge the product through substrate, to the well, and to the surface.

There are other factors which are known to contribute to the decrease in production, most of which can be countered or overcome through appropriate well treatment. One such treatment includes the injection pressure of a stimulating fluid into the well, which fluid is in turn forced into the substrate. The result will normally be a thinning of the product's viscosity in the instance of crude oil. Thus, reservoir pressure will be capable of pushing the less dense product to the surface.

An example of a typical well stimulation procedure embodies the injection of chemicals into the well in sufficient amounts and proportions, and over a set period of time to effect the desired stimulation function. While chemical injection is an accepted way of dealing with a production problem, the presence of chemicals downwell often creates an undesirable, deleterious or corrosive atmosphere. The latter will eventually be unacceptable for equipment that must function in this atmosphere.

In the instance of equipment which embodies fluid tight connections, where the seal is fabricated of a non-chemically resistant material, it will deteriorate to the point where it is no longer capable of functioning.

In one such instance, when carbon dioxide is injected into or produced from a well, the generation of a corrosive atmosphere downhole, will preclude the use of most deformable or pliable seal materials in connections. Functionally, the latter are normally squeezed into a compressed state at a separable joint to effectuate a barrier to passage of the injected or product fluid.

In other instances when such a seal is employed at a fluid tight joint, the chemical affect of $CO_2$ in the seal itself, will cause the seal to deteriorate or to expend. When this occurs, the seal material could bond with the adjacent metallic parts, thereby prohibiting subsequent separation of the parts when the seal is to be broken. The cost of cleaning the well to overcome such a condition, and the damage to the equipment involved can be a costly experience.

Toward overcoming this problem in the periodic treatment of a well for stimulating production or enhancing product recovery, the present seal is adapted for use in a downhole situation exhibiting a corrosive atmosphere. The seal is formed in an elongated pipe string and includes a lower pipe segment which is prepositioned within a well. The lower segment includes an upwardly facing receptacle or socket.

An upper segment of the pipe string which conducts the pressurized flow of treating or produced fluid, includes a connector comprised of one or more rings or gaskets of a deformable, preferably extrudable soft metal. The metallic seal ring or rings are positioned on the connector to sealably engage corresponding surfaces in the upfacing receptacle.

As the heavy upper pipe segment descends into the well, it will bear against and cause the deformable metal ring or rings to be extruded into an annular extrusion space or chamber. The latter is defined between corresponding surfaces of the receptacle and the connector respectively.

Subsequent to the softer metal extrusion phase, further lowering of the pipe string upper segment will end when the connector face contacts a corresponding hard metal surface of the receptacle to form a circular, metal-to-metal line seal.

It is therefore an object of the invention to provide a metal-to-metal downhole seal for a packer and/or a pipe string or the like which is adapted to function in a deleteriously corrosive atmosphere.

A further object is to provide a downhole well seal for a packer or pipe string having at least one separable joint which is formed by a hard metal seal, together with and in cooperation with a soft metal extruded gasket seal.

A still further object is to provide coacting hard and soft metal seals in a downhole packer and/or pipe joint, wherein the softer metal is extruded until the hard metal seal is established, thereby to preclude further movement of the pipe segments toward each other.

Another object is to form a fluid tight seal in a packer and/or a pipe joint which includes a first metal-to-metal line seal, and a second sacrificial soft metal gasket.

DESCRIPTION OF THE DRAWINGS

FIGS. 2 through 5 are partial cross-sectional views taken along line 2—2 in FIG. 1.

Figure 1:
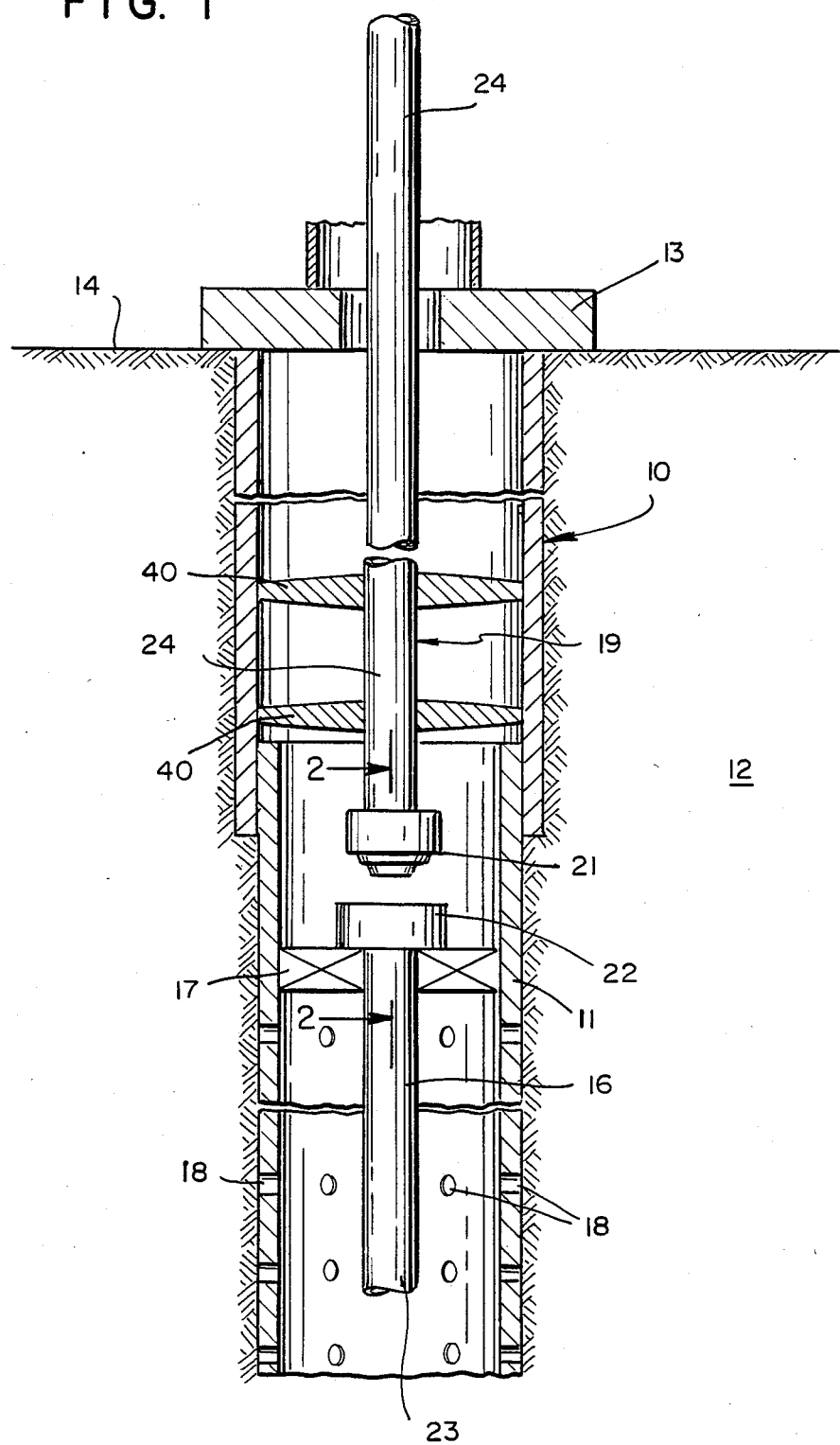
FIG. 1 is an elevation view in cross-section of a subterranean well shown in the present invention.
Figure 4:
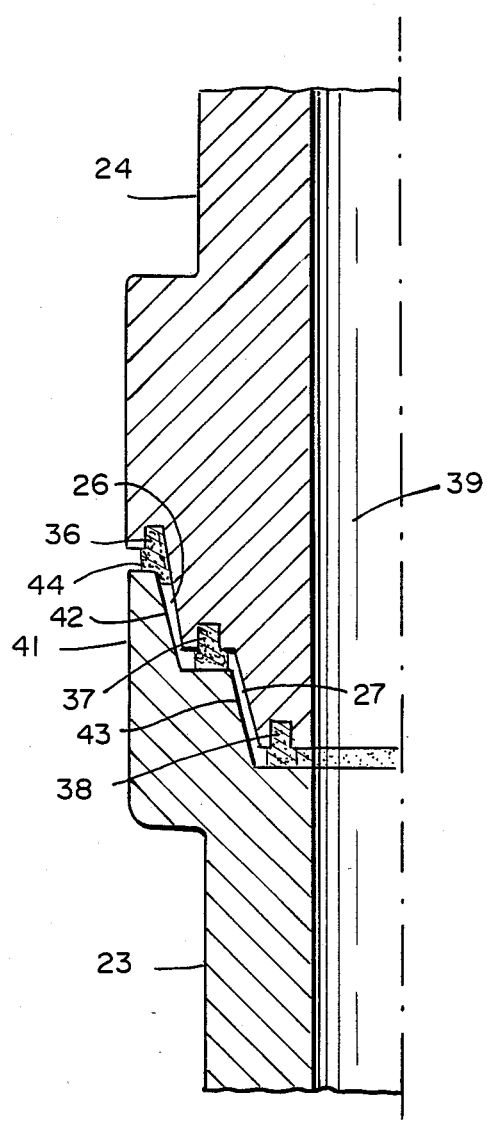

Briefly stated, the invention relates to a metal-to-metal packer seal which is adapted to function in conjunction with a well treating or producing operation. The pipe string is separable at a sealable joint which is positioned on top of a packer within the well. The sealing efficiency of the joint, whereby to confine corrosive fluids to the pipe interior, is achieved through the combination of a hard, metal-to-metal seal, which cooperates with an extrudable metal, sacrificial gasket.

The latter is formed as the result of the pipe string's heavy upper segment being registered in a corresponding receptacle formed in the pipe string lower or downhole segment which is firmly fixed in place. The compressive force generated between the two pipe segments extrudes the soft metal into the extrusion compartment or space which is formed as a result of the proximity between the respective connector and receptacle.

The disclosed pipe joint comprises primarily a single line surface seal defined by contacting surfaces between the two hard metal pipe segments. The joint, however, can function with one, or more than one extruded metal gaskets so long as the latter are resistant to the deleterious effects such as corrosion or deterioration by being contacted with the well treating or producing fluid.

In the following, the invention will be described in a representative embodiment wherein the hard metal-to-metal line contact seal is supplemented by three rings of a softer metal which are concurrently extruded into the narrow compartment formed by the two mating pipe segments.

In the following description, the terminology "corrosive" is meant to describe a condition established within a well being treated or producing corrosive fluid ($CO_2$). Normally such an atmosphere would be highly deleterious to the usual soft or pliable, non-metallic gaskets commonly employed in such operations.

The term "deflecting or deforming surfaces" on the receptacle or the connector segment, refers to those surfaces which contact the ring of extrudable metal, whereby to deform and force the latter into the extrusion compartment.

The term "extrudable metal" or "extrudable gasket" as hereinafter referred to relates to a metal or metallic alloy which is not subject to deterioration as a result of contact with the well's corrosive atmosphere. The physical properties of the metal or alloy are such that it will assume a permanent set when it is extruded or compressed into a confined compartment or space. Lead or lead alloys represent examples of such materials.

Referring to the drawings, a well 10 of the type contemplated is shown which is comprised in general of an elongated casing 11 that extends downwardly into a hydrocarbon-containing reservoir 12. Casing 11 normally consists of a series of connected steel casing lengths in progressively decreasing diameters, which are axially aligned to define the well. The casings, and preferably the upper casing, is normally cemented in place in the initially drilled borehole.

Well 10 includes a typical well head 13 which is not shown here with specificity. The well head nonetheless is provided with the usual valving and equipment to regulate the flow of hydrocarbon fluid from the reservoir substrate 12 to the surface 14.

Casing 11 includes perforations 18 which are formed at the levels of substrate in which hydrocarbon fluids are to be removed. These perforations are usually made after the casing is in place to permit the inflow of hydrocarbon under gas pressure of the surrounding substrate.

For treating a reservoir 12 to increase hydrocarbon productivity or for any specified purpose, an injector or producer pipe string 19 is prepositioned in the well and includes a series of a connected pipe or conductor lengths which extend toward the well bottom. To illustrate the present invention, the elongated pipe string 19 is shown with the lower segment 16 fixedly positioned in well casing 11 by a packer 17. The latter is firmly engaged with the pipe string outer diameter, and is outwardly expanded along its periphery to firmly grasp the adjacent casing walls.

The upper segment 24 of the pipe string 19, is shown with an end connector 21 spaced from the upwardly facing receiving receptacle 22.

Referring to FIG. 2, connector 21 is comprised of a head which is fastened to or depends from the lower end of upper pipe section 24. The latter in turn extends to the surface 14. Connector 21 is comprised of a plurality of successively arranged frusto conical surfaces 26 and 27 which define an angle of approximately 10° with the pipe's longitudinal axis. These surfaces are of decreasing diameter and are spaced one from the other along the longitudinal axis of upper pipe segment 24.

The respective frusto conical surfaces 26 and 27 are bounded by, and separated by substantially flat annular surfaces 28, 29 and 31. Each flat annular surface or ring deforming face includes a positioning groove 32, 33 and 34. The latter, as shown in FIG. 3, are formed to a sufficient depth to accommodate preformed rings 36, 37 and 38, formed of a soft metal or metallic alloy.

The innermost annular surface 31 terminates at the central passage 39, carrying well treating fluid from a pressurized source, to the substrate 12 to be treated.

Referring to FIGS. 2 through 6, lower pipe segment 16 includes a receptacle or socket 22 into which a multiple facet socket is formed. The latter is comprised of a plurality of frusto conical indentations 42 and 43 which are spaced longitudinally a sufficient distance apart to permit them to register with corresponding surfaces of connector 21.

The concentrically arranged, frusto conical receptacle surfaces 42 and 43 are bounded by, and separated by ring deforming planar deflecting surfaces 44, 46 and 47 which are in substantial vertical alignment with corresponding annular flats 28, 29 and 31 in connector 21.

Referring to FIG. 3, to form or complete the desired seal between cooperating surfaces of receptacle 22, and connector 21, the receptacle is fixed in an upright, upward facing position by packer 17. The corresponding sealing surfaces of connector 21 are then registered within the receptacle by slowly lowering the entire upper pipe segment 24 into the well. This step can be facilitated with the aid of guides or stabilizers 40 to assure alignment of the mating members.

In preparation toward forming the fluid tight pipe joint while at the surface, connector 21 is provided with circular extrudable rings 36, 37 and 38, comprised of a relatively soft metal or metal alloy. The metallic rings are sufficiently rigid to maintain their circular configuration, yet soft enough to be extruded when subjected to compressive pressure between the slowly closing, mating surfaces of the connector 21 and receptacle 22.

The respective gasket rings 36, 37 and 38, as shown, are fixed into the concentric ring grooves 32, 33 and 34 in connector 21 such that they will maintain their position without being dislodged during descent of the upper pipe segment 24. Each deformable ring, 36 for example, is positioned preferably with one portion force fitted into the ring groove 32. The remaining or outer portion of the ring extends downwardly beyond the adjacent planar face 28. Thus, ring 36 will be contacted by the corresponding deflecting surface 44 in receptacle 22.

The gasket rings, for the present purpose are formed of materials which are capable of being deformed and extruded as the pipe joint segments are brought into contact. Among the materials applicable to this purpose are lead and copper and alloys thereof, or pure nickel. The compressing materials in connector 21 and receptacle 22 are formed of a hard grade of steel or steel alloys usually used in hydrocarbon production.

Gasket rings 36, 37 and 38 as noted, are retained in the respective grooves prior to being compressed and extruded. For example, the ring metal can be poured in molten condition into the respective ring grooves. Thereafter, the poured ring can be machined to its required size and configuration.

Referring to FIG. 3, as connector 21 registers within the upward facing receptacle 22, the weight of upper pipe segment 24 will cause the respective gasket rings to first engage the receptacle deflecting surfaces. Continued lowering of the pipe will then cause the lower end of the metallic rings to be deformed, extruded and compressed between the gradually closing contiguous surfaces of the connector and the socket. The latter in effect define a progressively decreasing extrusion chamber. For example, as ring 37 is forced into contact with annular shoulder 46, the protruding lower ring section will be deformed to form a seal ring between the mating surfaces.

Figure 6:
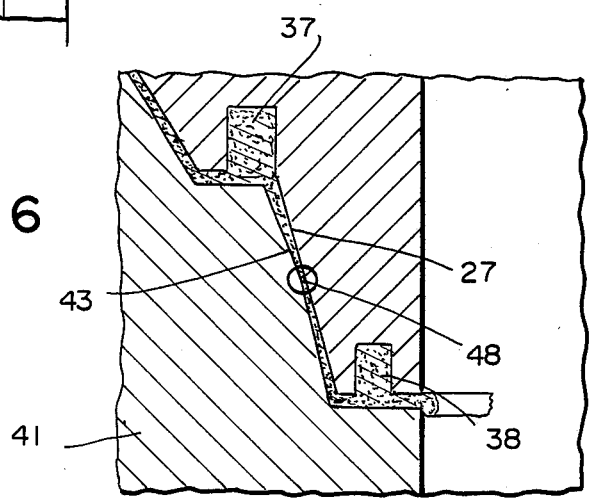
FIG. 6 is an enlarged view of a portion of FIG. 5.

Referring to FIG. 6, the closing movement of the two mating segments toward each other will continue until such movement is terminated as a result of contact between the mating connector surface 29 and socket surface 46. When the shoulders are in contact any further movement will cease. To assure a circular, line seal along the contact area 48, one or both of said surfaces is preferably formed with a slight convex radius.

Figure 5:
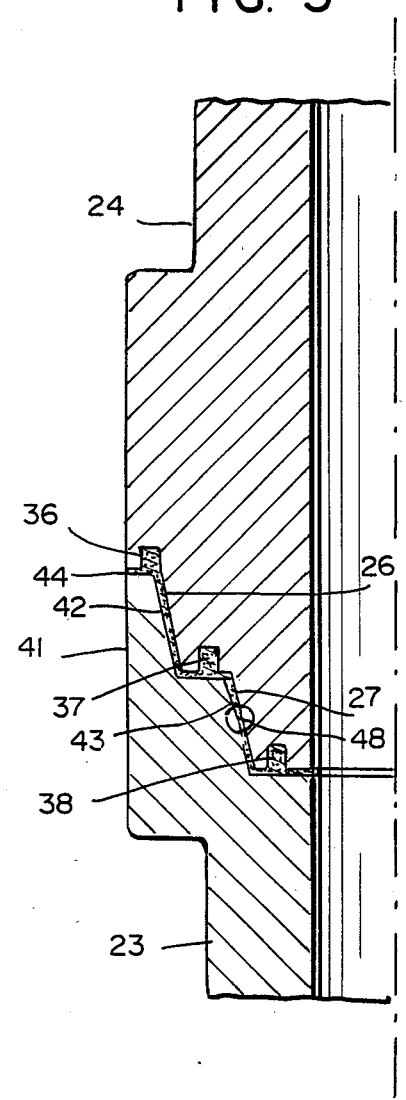

As shown in FIG. 5, when connector 21 and the receptacle 22 are in full registry, the hard metal-to-metal line seal at 48 will be supplemented by a soft, metal-to-metal extruded sealing gasket on each side thereof. Further, the outer soft metal gasket will comprise the two outer rings which, as a result of being extruded, can form a continuous gasketing interlayer to avoid passage of corrosive fluids from the pipe string central passage 39.

To assure the integrity of the extruded metal gasket, the engaging segments of the respective connector 21 and receptacle 22, can be formed to maintain a fluid tight relationship in spite of minor degrees of relative movement therebetween.

Figure 7:
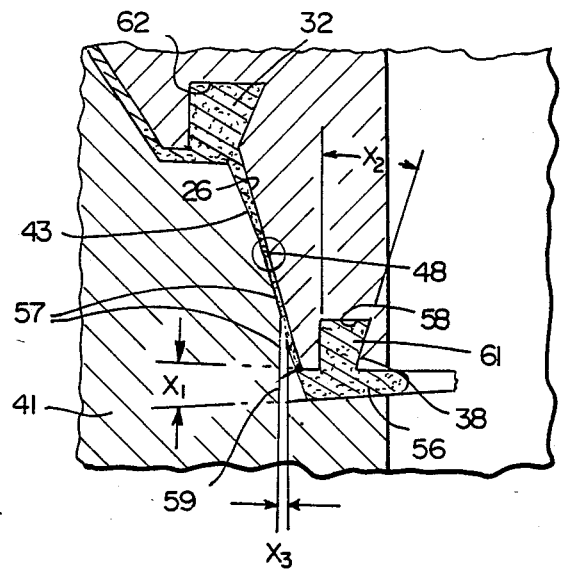
FIG. 7 is an enlarged cross-sectional drawing similar to FIG. 6.

As shown in FIG. 7, the receptacle recess can be formed with an annular pocket to facilitate formation of the extrusion chamber. Said pocket is defined by a lower surface 56, and a peripheral rim 57. Said lower surface 56, in conjunction with the upper ring groove 58, defines an extrusion compartment or cavity having a side wall 59, forming 6° to 8° negative angle ($X_3$) with the vertical line.

Lower surface 56 can be provided with an outwardly facing slope $X_1$ of between 6° to 8°. The upright rim 57 is provided with a slightly divergent wall offset from vertical. Side wall 59, with lower wall 56, forms an included angle of between 74 and 76°.

Thus, after gasket 61 has been formed by extrusion of the metallic ring, if the upper segment of the pipe string can be separated a slight amount from the lower or downhole segment this separation should not affect the seal's integrity, since the gasket 61 will maintain sliding contact with wall section 59 as the gasket is raised.

To assure that the extruded gasket 61 is removed from the well when the upper pipe segment is raised, the respective ring grooves 58 and 62, can be provided with a converging opening. Thus, the gasket will in effect be retained and locked in place on the upper pipe string segment to assure removal of the gasket when the pipe joint is physically separated.

Figure 8:
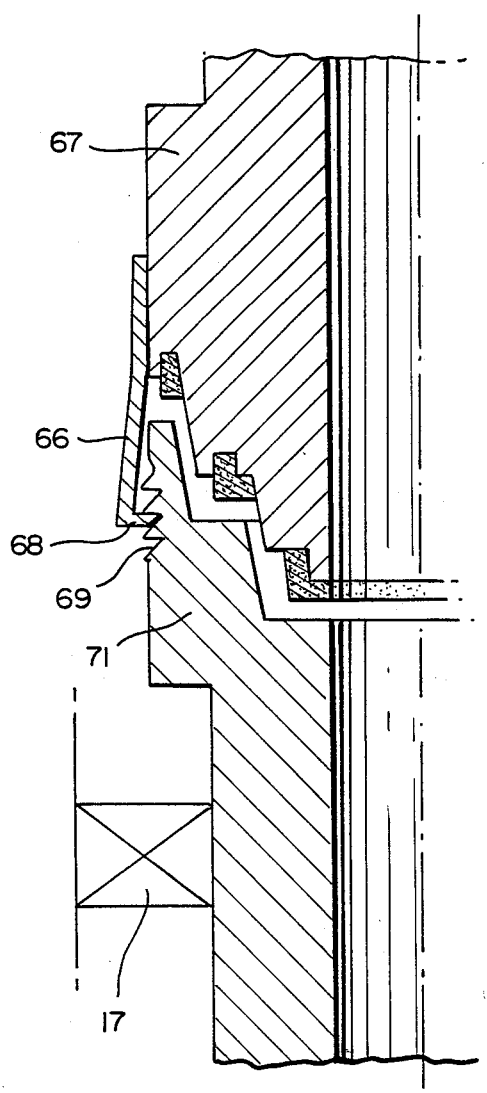
FIG. 8 illustrates an alternate embodiment of the invention as shown in FIG. 3.

Referring to FIG. 8, in one alternate embodiment of the well pipe string, latching means can be provided to maintain the integrity of the separable joint after the latter has been made up or completely formed. Experience has shown, for example, that the fluid tight seal is readily established by extrusion of the metallic gasket under the weight of the pipe string upper segment. The fluid tight metallic seal can readily be maintained against the internal pressure of the treating liquid.

However, when the injected treating fluid is in a relatively cool state or condition, the metallic pipe string upper segment will be likewise chilled and subjected to thermal contraction. Since the well positioned packer firmly locates the lower pipe string segment, such contraction of the upper section will cause the seal joint to be drawn apart with the resulting possible fluid leakage.

Referring to FIG. 8, to avoid or minimize joint separation under these circumstances, one embodiment of a joint latching or clamping means can take the form of a collet latch of the type generally known to the drilling and well treating industry. The latter in one embodiment is comprised primarily of a series of dogs 66 which are operably carried on the upper pipe string segment 67. The latching dogs include an engaging lip 68 that is radially movable between inner and outer positions.

Operationally, as the pipe string upper segment is lowered onto its receptacle, the displaceable lower ends of dogs 66 will slide across a series of threaded teeth 69 formed on the receptacle 71 outer surface. When the joint has become fully engaged at the line of contact, the latch dogs engaging the respective teeth will retain the two pipe string members in close contact.

At such time as the pipe string upper segment is to be removed from the downhole segment, said upper segment can be rotatably withdrawn, thereby disengaging the joint. The deformed or extruded metal gasket will remain on the upper connector end face and will be raised to the surface to be subsequently removed by heat or by machining.

It is understood that although modifications and variations of the invention can be made without departing from the spirit and scope thereof, only such limitations should be imposed as are indicated in the appended claims.

I claim:

1. In an elongated pipe string comprised of interconnectable pipe lengths which, when engaged, form separable upper and downhole pipe segments, for conducting a treating fluid into a subterranean well, said pipe string including a separable metal-to-metal seal joint adapted to fluid tightly engage said upper and downhole segments, and which is resistant to corrosive deterioration when exposed to a corrosive atmosphere caused by said treating fluid, the downhole segment of said pipe string having an upwardly facing end receptacle which defines at least one frusto-conical sealing surface, and a gasket deflecting surface, intersecting said at least one frusto-conical sealing surface, the upper segment of said pipe string having a connector at the lower end thereof aligned in axial registry with said upwardly facing end receptacle, and having a peripheral seal area having means to form a first metal-to-metal ring of contact with a portion of said at least one frusto-conical sealing surface, to define an annular extrusion compartment at each opposite side of the said first metal-to-metal ring of contact, between spaced apart contiguous surfaces of the connector and the end receptacle, at least two gaskets comprised of an extrudable metal, each of which substantially occupies each of said annular extrusion compartment to form second metal-to-metal annular seals compressed between the pipe string upper segment, and the pipe string downhole segment.

2. In the apparatus as defined in claim 1, wherein said gaskets are formed of an extrudable metal which is resistant to deterioration when exposed to the well's corrosive atmosphere.

3. In the apparatus as defined in claim 1, wherein said gaskets are formed of a metal from the group comprising lead, lead containing alloy, and copper.

4. In the apparatus as defined in claim 1, wherein said gaskets are comprised of preformed rings fabricated of the extrudable metal.

5. In the apparatus as defined in claim 4, wherein said preformed rings of extrudable metal are prepositioned on said pipe string upper segment connector, prior to the upper segment connector being positioned into registry with the lower pipe segment receptacle.

6. In the apparatus as defined in claim 1, wherein said upper pipe segment connection is characterized by a frusto-conical portion defining said annular extrusion compartments, each of said extrusion compartments being substantially occupied by each of said extrudable metallic gaskets.

7. In the apparatus as defined in claim 1, wherein said upper pipe segment connector is characterized by a frusto-conical portion embodying at least two spaced apart annular recesses, each of said annular recess defining a portion of said annular extrusion compartment, each recess being substantially occupied by said extrudable metallic gasket.

8. In the apparatus as defined in claim 7, wherein said first metal-to-metal ring of contact is substantially concentric with said extruded metal gaskets.

9. In the apparatus as defined in claim 7, wherein said respective ring of contact, and said extrudable metal gaskets are metal-to-metal disposed concentrically of the pipe string longitudinal axis.

10. In the apparatus as defined in claim 1, including latching means disposed adjacent to the pipe string separable seal joint, and being operable to engage the respective upper pipe segment and the downhole segment in close contact subsequent to said metal-to-metal ring of contact seal being formed.

11. In the apparatus as defined in claim 10, wherein said latching means is remotely operable to a disengaged position to allow the pipe string upper segment to be upwardly separated from the downhole segment.

12. In the apparatus as defined in claim 10, wherein said latching means includes a plurality of latching dogs operably depending from said pipe string upper segment and being operable between engaged and disengaged positions to engage said downhole segment.

13. In the apparatus as defined in claim 10, wherein said latching means includes a latching collet.

* * * * *